(12) United States Patent
Tanaami et al.

(10) Patent No.: US 11,942,623 B2
(45) Date of Patent: Mar. 26, 2024

(54) NEGATIVE ELECTRODE FOR USE IN NON-AQUEOUS ELECTROLYTE SECONDARY BATTERY AND NON-AQUEOUS ELECTROLYTE SECONDARY BATTERY INCLUDING SAME

(71) Applicant: HONDA MOTOR CO., LTD., Tokyo (JP)

(72) Inventors: Kiyoshi Tanaami, Saitama (JP); Toshimitsu Tanaka, Saitama (JP); Yuji Isogai, Saitama (JP); Makiko Takahashi, Saitama (JP); Shintaro Aoyagi, Saitama (JP); Takashi Mukai, Osaka (JP); Yuta Ikeuchi, Osaka (JP); Taichi Sakamoto, Osaka (JP); Naoto Yamashita, Osaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 189 days.

(21) Appl. No.: 17/585,590

(22) Filed: Jan. 27, 2022

(65) Prior Publication Data
US 2022/0246905 A1 Aug. 4, 2022

(30) Foreign Application Priority Data
Feb. 1, 2021 (JP) ................. 2021-014417

(51) Int. Cl.
*H01M 4/00* (2006.01)
*H01M 4/134* (2010.01)
(Continued)

(52) U.S. Cl.
CPC ......... *H01M 4/134* (2013.01); *H01M 4/5825* (2013.01); *H01M 4/621* (2013.01); *H01M 2004/027* (2013.01)

(58) Field of Classification Search
CPC .... H01M 4/134; H01M 4/621; H01M 4/5821; H01M 2004/027; Y02E 60/10
See application file for complete search history.

(56) References Cited

U.S. PATENT DOCUMENTS

2019/0326601 A1  10/2019 Sakamoto et al.

FOREIGN PATENT DOCUMENTS

| JP | 6149147 B1 | 6/2017 | |
| JP | 6369818 B2 | 8/2018 | |
| WO | WO-2020202843 A1 * | 10/2020 | ........ H01M 10/0525 |

OTHER PUBLICATIONS

Sakamoto et all, Non-Aqueous Electrolyte Secondary Battery, Oct. 2020, See the Abstract. (Year: 2020).*

* cited by examiner

*Primary Examiner* — Cynthia H Kelly
*Assistant Examiner* — Monique M Wills
(74) *Attorney, Agent, or Firm* — CKC & Partners Co., LLC

(57) ABSTRACT

Provided are a negative electrode that is for use in a non-aqueous electrolyte secondary battery, includes a porous metal body as a current collector, contains a skeleton-forming agent highly infiltrated in the current collector so that it is less likely to suffer from structural degradation and provides improved cycle durability; and a non-aqueous electrolyte secondary battery including such a negative electrode. The negative electrode for use in a non-aqueous electrolyte secondary battery includes a current collector including a porous metal body; a first negative electrode material disposed in pores of the porous metal body and including a conductive aid, a binder, and a negative electrode active material including a silicon-based material; and a second negative electrode material disposed in pores of the (Continued)

porous metal body and including a skeleton-forming agent including a silicate having a siloxane bond.

6 Claims, 7 Drawing Sheets

(51) Int. Cl.
*H01M 4/58* (2010.01)
*H01M 4/62* (2006.01)
*H01M 4/02* (2006.01)

NEGATIVE ELECTRODE FOR USE IN NON-AQUEOUS ELECTROLYTE SECONDARY BATTERY AND NON-AQUEOUS ELECTROLYTE SECONDARY BATTERY INCLUDING SAME

This application is based on and claims the benefit of priority from Japanese Patent Application No. 2021-014417, filed on 1 Feb. 2021, the content of which is incorporated herein by reference.

BACKGROUND OF THE INVENTION

Field of the Invention

The present invention relates to a negative electrode for use in a non-aqueous electrolyte secondary battery and to a non-aqueous electrolyte secondary battery including such a negative electrode.

Related Art

In recent years, non-aqueous electrolyte secondary batteries, such as lithium-ion secondary batteries, have been increasingly used in automobiles and so on because of their compact size, light weight, and high power. The term "non-aqueous electrolyte secondary battery" is a generic term for electricity storage devices including a series of batteries that use an electrolyte not based on water and are chargeable and dischargeable. Known examples of the non-aqueous electrolyte secondary battery include lithium-ion batteries, lithium polymer batteries, lithium all-solid-state batteries, lithium-air batteries, lithium-sulfur batteries, sodium-ion batteries, potassium-ion batteries, polyvalent ion batteries, fluoride batteries, and sodium-sulfur batteries. The non-aqueous electrolyte secondary battery includes, as main components, a positive electrode, a negative electrode, and an electrolyte. When the electrolyte has fluidity, the non-aqueous electrolyte secondary battery further includes a separator disposed between the positive and negative electrodes.

For example, a technique for improving battery life is disclosed, which includes providing, on the surface of at least an active material, a skeleton-forming agent including a silicate having a siloxane bond; and allowing the skeleton-forming agent to infiltrate from the surface to the inside (see, for example, Patent Document 1). This technique, which can form a strong skeleton on the active material, is suggested to improve battery life. Another technique is also disclosed, which includes using the skeleton-forming agent to form a negative electrode including a silicon (Si)-based active material (see, for example, Patent Document 2).

Patent Document 1: Japanese Patent No. 6369818
Patent Document 2: Japanese Patent No. 6149147

SUMMARY OF THE INVENTION

The non-aqueous electrolyte secondary battery has been required to have an improved energy density. It may be effective in improving energy density to increase the negative electrode thickness or to increase the negative electrode active material density. Unfortunately, in the conventional art, the negative electrode production has a limitation on the negative electrode thickness. Specifically, an electrode material mixture layer can be formed with a practical thickness of at most less than 100 μm by coating on a conventional current collector foil. If the thickness is 100 μm or more, problems such as coating unevenness, cracks, and delamination may occur, which will make it difficult to produce a negative electrode with high accuracy.

A balance should also be established between the binding force of a binder and the expansion and contraction of the negative electrode active material, which requires a limitation on the amount of the negative electrode active material per unit area in view of durability. Specifically, the negative electrode active material capacity per unit area should have an upper limit of about 4 mAh/cm$^2$ (when the thickness is 50 μm), and if it is more than that, the cycle performance cannot be kept at a satisfactory level. If the active material capacity is less than 4 mAh/cm$^2$, an improvement in energy density cannot be expected.

Solutions to the problems may include using a porous metal body as a current collector for the negative electrode of a non-aqueous electrolyte secondary battery and filling the porous metal body with an electrode material mixture. It has become apparent that an inorganic binder may insufficiently enter the pores of a current collector when a negative electrode for a non-aqueous electrolyte secondary battery is produced using a porous metal body as a current collector, a silicon-based material as a negative electrode active material, and a skeleton-forming agent as a coating on the current collector and the electrode active material. It has also become apparent that the non-aqueous electrolyte secondary battery including such a negative electrode may suffer from structural degradation of the inside of the electrode during repeated charging and discharging and thus may suffer from performance degradation.

Thus, a need exists for a negative electrode that includes a porous metal body as a current collector, contains a skeleton-forming agent highly infiltrated in the current collector so that it is less likely to suffer from structural degradation and provides improved cycle durability for a non-aqueous electrolyte secondary battery, and a need also exists for a non-aqueous electrolyte secondary battery including such a negative electrode.

The present invention has been made in light of the circumstances mentioned above, and an object of the present invention is to provide a negative electrode that is for use in a non-aqueous electrolyte secondary battery, includes a porous metal body as a current collector, contains a skeleton-forming agent highly infiltrated in the current collector so that it is less likely to suffer from structural degradation and provides improved cycle durability for a non-aqueous electrolyte secondary battery, and to provide a non-aqueous electrolyte secondary battery including such a negative electrode.

(1) To achieve the object, the present invention provides a negative electrode for use in a non-aqueous electrolyte secondary battery, the negative electrode including: a current collector including a porous metal body; a first negative electrode material disposed in pores of the porous metal body and including a negative electrode active material, a conductive aid, and a binder, the negative electrode active material including a silicon-based material; and a second negative electrode material disposed in pores of the porous metal body and including a skeleton-forming agent including a silicate having a siloxane bond, the negative electrode having a pair of first regions and a second region, the pair of first regions being each located in each outer portion of the current collector in the thickness direction of the current collector and containing the first negative electrode material and the second negative electrode material, the second region being located at the center in the thickness direction of the current collector and containing the second negative electrode material but not containing the first negative electrode material.

(2) To achieve the object, the present invention also provides a negative electrode for use in a non-aqueous electrolyte secondary battery, the negative electrode including: a current collector including a porous metal body; a first negative electrode material disposed in pores of the porous metal body and including a conductive aid; a second negative electrode material disposed in pores of the porous metal body and including a binder and a negative electrode active material including a silicon-based material; and a third negative electrode material disposed in pores of the porous metal body and including a skeleton-forming agent including a silicate having a siloxane bond, the negative electrode having a pair of first regions and a second region, the pair of first regions being each located in each outer portion of the current collector in the thickness direction of the current collector and containing the first negative electrode material, the second negative electrode material, and the third negative electrode material, the second region being located at the center in the thickness direction of the current collector and containing the first negative electrode material and the third negative electrode material but not containing the second negative electrode material.

(3) In the negative electrode according to aspect (1) or (2) for use in a non-aqueous electrolyte secondary battery, the skeleton-forming agent may include a silicate represented by formula (1) shown below.

$$A_2O \cdot nSiO_2 \qquad \text{Formula (1)}$$

In formula (1), A represents an alkali metal.

(4) In the negative electrode according to any one of aspects (1) to (3) for use in a non-aqueous electrolyte secondary battery, the second region may have a thickness equal to 0.5 to 15% of the overall thickness of the negative electrode.

(5) In the negative electrode according to any one of aspects (1) to (4) for use in a non-aqueous electrolyte secondary battery, the porous metal body may be a foamed metal body.

(6) The present invention further provides a non-aqueous electrolyte secondary battery including the negative electrode according to any one of aspects (1) to (5).

The present invention makes it possible to provide a negative electrode that is for use in a non-aqueous electrolyte secondary battery, includes a porous metal body as a current collector, contains a skeleton-forming agent highly infiltrated in the current collector so that it is less likely to suffer from durability degradation and provides improved energy density, and also makes it possible to provide a non-aqueous electrolyte secondary battery including such a negative electrode.

DETAILED DESCRIPTION OF THE INVENTION

First Embodiment

Hereinafter, a first embodiment of the present invention will be described in detail with reference to the drawings.

Negative Electrode

Figure 1:
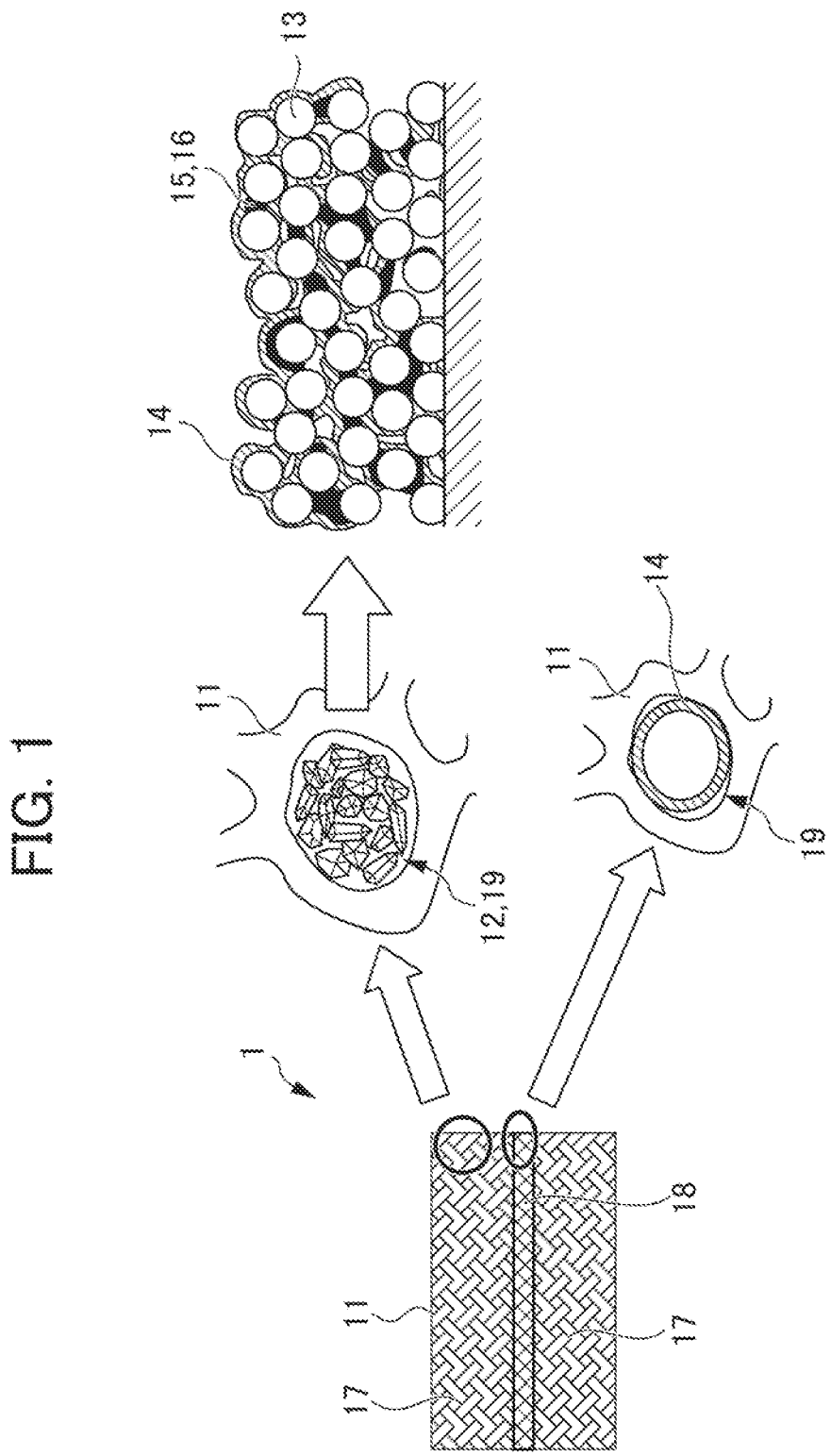
FIG. 1 is a view schematically showing the inner structure of a negative electrode according to a first embodiment of the present invention for use in a non-aqueous electrolyte secondary battery.

FIG. 1 is a view schematically showing the inner structure of a negative electrode according to an embodiment of the present invention for use in a non-aqueous electrolyte secondary battery. The negative electrode 1 according to this embodiment for use in a non-aqueous electrolyte secondary battery includes a current collector 11, a first negative electrode material 12, and a second negative electrode material 19. The current collector 11 includes a porous metal body. The first negative electrode material 12 is disposed in pores of the porous metal body and includes a negative electrode active material 13 including a silicon-based material; a conductive aid 15; and a binder 16. The second electrode material 19 is disposed in pores of the porous metal body and includes a skeleton-forming agent 14 including a silicate having a siloxane bond. The negative electrode 1 according to this embodiment for use in a non-aqueous electrolyte secondary battery has a pair of first regions 17 and a second region 18. The pair of first regions 17 are located in the two outer portions of the current collector 11 in the thickness direction of the current collector 11 and contain the first negative electrode material 12 and the second negative electrode material 19. The second region 18 is located at the center in the thickness direction of the current collector 11 and contains the second negative electrode material 19 but does not contain the first negative electrode material 12. For example, when this embodiment is applied to a negative electrode for use in a lithium-ion secondary battery, the skeleton-forming agent can be highly infiltrated in the current collector including a porous metal body, which makes it possible to provide a negative electrode that is for use in a lithium-ion secondary battery, is less likely to suffer from durability degradation or structural degradation, and provides improved levels of energy density and cycle durability, and also makes it possible to provide a lithium-ion secondary battery including such a negative electrode. Hereinafter, examples in which this embodiment is applied to a negative electrode for use in a lithium-ion secondary battery will be described in detail. It will be understood that a variety of additions, modifications, or deletions may be made with respect to such examples without departing from the gist of the present invention.

The current collector 11 may be made of a porous metal body. The current collector 11 may be, for example, a mesh, a woven fabric, a nonwoven fabric, an embossed body, a punched body, an expanded body, or a foamed body, and is preferably a foamed metal body. In particular, the current collector 11 is preferably a foamed metal body having a three-dimensional network structure with continuous pores, which may be, for example, Celmet® (manufactured by Sumitomo Electric Industries, Ltd.).

The porous metal body may be made of any material having electron conductivity and being capable of conducting electricity to the electrode material held therein. Examples of such a material include electrically-conductive metals, such as Al, Al alloys, Ni, Ni—Cr alloys, Fe, Cu, Ti, Cr, Au, Mo, W, Ta, Pt, Ru, and Rh, and electrically-conductive alloys each including two or more of these electrically-conductive metals, such as stainless steel (e.g., SUS 304, SUS 316, SOS 316L, YUS 270). A material other than the electrically-conductive metals or alloys may also be used, such as a multilayer-structure material including different metals, such as Fe and Cu or Ni coated thereon. In particular, Ni or a Ni alloy is preferred because of its high electron conductivity and reduction resistance.

The porous metal body preferably has a thickness of 10 μm or more, more preferably 50 μm or more. The porous metal body preferably has a thickness of 1 mm or less, more preferably 800 μm or less.

Before being subjected to pressing, the porous metal body preferably has an average pore diameter of 100 μm to 850 μm. When the porous metal body has an average pore diameter within this range, the negative electrode active material 13 can be loaded or supported with a stabilized distance to the metal skeleton in the porous metal body, which can improve the electron conductivity and suppress an increase in battery internal resistance. That can also prevent the electrode material mixture from coming off even when volume changes occur associated with charging and discharging.

The porous metal body preferably has a specific surface area of 1,000 to 10,000 $m^2/m^3$. This is 2 to 10 times the specific surface area of a conventional common current collector foil. When the porous metal body has a specific surface area within this range, the electrode material mixture can have improved contact with the current collector 11, which can suppress an increase in battery internal resistance. The specific surface area is more preferably 4,000 to 7,000 $m^2/m^3$.

The porous metal body preferably has a porosity of 90 to 99%. When the porous metal body has a porosity within this range, the electrode material mixture can be charged in a large amount, which will result in an increase in battery energy density. Specifically, if the porosity exceeds 99%, the porous metal body may have significantly reduced mechanical strength and may easily break due to volume changes associated with charging and discharging. If the porosity is less than 90%, not only the electrode material mixture may be charged in a relatively small amount, but also the electrode may have reduced ionic conductivity, which may make it difficult to obtain satisfactory input/output characteristics. From these points of view, the porosity is more preferably 93 to 98%.

The porous metal body preferably has a weight per unit area of 1 to 100 $mg/cm^2$. When the porous metal body has a weight per unit area within this range, the active material can provide a sufficient capacity to enable the electrode to have the designed capacity. The weight per unit area is more preferably 5 to 60 $mg/cm^2$.

The negative electrode active material 13 may be a material capable of reversibly storing and releasing lithium ions. Specifically, the negative electrode active material 13 may include a silicon-based material having a high capacity. The silicon-based material may be elemental silicon, a silicon alloy, silicon oxide, or a silicon compound. As used herein, the term "elemental silicon" refers to crystalline or amorphous silicon with a purity of 95% by mass or more. The term "silicon alloy" means Si-M alloys composed of silicon and any other transition element M, In which M is, for example, Al, Mg, ha, Ag, Sn, Ti, Y, Cr, Ni, Zr, V, Kb, or Mo. The Si-M alloys may be all proportional solid solution alloys, eutectic alloys, hypoeutectic alloys, hypereutectic alloys, or peritectic alloys. The term "silicon oxide" means an oxide of silicon or a complex composed of elemental silicon and $SiO_2$, in which the element ratio of O to Si may be 1.7 or less. The term "silicon compound" refers to a substance composed of chemically bonded two or more elements including silicon. Among them, elemental silicon 1" preferred because it can form a good interface layer as described later. Alternatively, a mixture or composite of the silicon-based material and a carbonaceous material may also be used.

The silicon-based material may be in any form. The silicon-based material may be in the form of spherical particles, elliptical particles, faceted particles, strip-shaped particles, fibrous particles, flaky particles, doughnut-shaped particles, or hollow particles, which may be simple particles or granulated particles.

The negative electrode active material 13 including the silicon-based material may have an expansion rate of 10% or more during charging and discharging. This means that the negative electrode active material 13 may significantly expand and contract during charging and discharging. The use of the skeleton-forming agent 14 described later makes it possible to prevent durability degradation caused by such expansion and contraction.

In order for the electrode to have high cycle performance and high input/output characteristics, the silicon-based material is preferably in the form of particles with a diameter of 1.0 μm to 15 μm.

In this embodiment, the second negative electrode material 19 includes a skeleton-forming agent 14. The skeleton-forming agent 14 may include a silicate having a siloxane bond. More specifically, the skeleton-forming agent 14 preferably includes a silicate represented by formula (1) below.

$$A_2O \cdot nSiO_2 \qquad \text{Formula (1)}$$

In formula (1), A represents an alkali metal. In particular, A is preferably at least one of lithium (Li), sodium (Na), and potassium (K). The use of such a siloxane bond-containing alkali metal silicate as the skeleton-forming agent makes it possible to provide a lithium-ion secondary battery having high strength, high heat resistance, and long cycle life.

In formula (1), n is preferably 1.6 or more and 3.9 or less. When n is within this range, a skeleton-forming agent solution prepared by mixing the skeleton-forming agent 14 and water can have an appropriate level of viscosity, so that the skeleton-forming agent 14 can be easily infiltrated into the negative electrode material 12 in the process of applying the skeleton-forming agent solution to the negative electrode containing silicon as the negative electrode active material 13, which will be described later. This makes it possible to more reliably obtain a lithium-ion secondary battery having high strength, high heat resistance, and long cycle life. More preferably, n is 2.0 or more and 3.5 or less.

The silicate is preferably amorphous. The amorphous silicate has a disordered molecular arrangement and thus will not cleave in a specific direction in contrast to crystals. Therefore, the use of the amorphous silicate as the skeleton-forming agent 14 can improve cycle life characteristics.

For example, the skeleton-forming agent solution may be applied to the negative electrode containing silicon as the negative electrode active material 13. In this process, the skeleton-forming agent 14 infiltrates between particles of the negative electrode active material 13. Thus, it is expected that the silicon of the negative electrode active material 13 can be fused with the silicate of the skeleton-forming agent 14, so that the silicate can undergo heat-induced dehydration reaction (silanol group condensation reaction) to form a siloxane bond (—Si—O—Si—) after being hydrolyzed. As a result, an inorganic interface layer will form at the interface between the negative electrode active material 13 and the skeleton-forming agent 14. In the negative electrode 1 according to this embodiment for use in a lithium-ion secondary battery, the resulting interface layer includes silicon derived from the siloxane bond; and an alkali metal resulting from the hydrolysis and other reactions of the silicate. It is expected that the presence of the interface layer allows strong bonding between the negative electrode active material 13 and the skeleton-forming agent 14, which will result in excellent cycle life characteristics.

In this embodiment, the content of alkali metal atoms in the interface layer based on the total constituent atoms is preferably higher than the content of alkali metal atoms in the skeleton-forming agent 14 based on the total constituent atoms. More specifically, the content of alkali metal atoms in the interface layer based on the total constituent atoms is preferably 5 times or more the content of alkali metal atoms in the skeleton-forming agent 14 based on the total constituent atoms. According to this feature, the negative electrode active material 13 can bond more strongly to the skeleton-forming agent 14, which will more effectively prevent delamination caused by the expansion and contraction of the negative electrode active material 13 during charging and discharging, more effectively prevent, wrinkling or cracking of the current collector 11, and more effectively improve cycle life.

The interface layer preferably has a thickness of 3 to 30 nm. When the interface layer has a thickness within this range, the negative electrode active material 13 can bond more strongly to the skeleton-forming agent 14, which will more effectively prevent delamination caused by the expansion and contraction of the negative electrode active material 13 during charging and discharging, more effectively prevent wrinkling or cracking of the current collector 11, and more effectively improve cycle life.

In this embodiment, the skeleton-forming agent 14 may contain a surfactant. In this case, the skeleton-forming agent 14 can have an increases affinity for the inside of the first negative electrode material 12 and can uniformly infiltrate into the negative electrode material 12. Is a result, a uniform skeleton can form between particles of the negative electrode active material 13 in the negative electrode material 12, which will further improve cycle life characteristics.

In this embodiment, the content (density) of the skeleton-forming agent 14 is preferably 0.5 to 2.0 mg/cm$^2$ based on the total weight of the first negative electrode material 12 and the second negative electrode material 19. When the content of the skeleton-forming agent 14 is within this range based on the total weight of the first negative electrode material and the second negative electrode material, the use of the skeleton-forming agent 14 can be more reliably effective.

The content of the skeleton-forming agent 14 is preferably 3.0 to 40.0% by mass when the total content of solids in the negative electrode active material 13, the skeleton-forming agent 14, the conductive aid 15, and the binder 16 is normalized to 100% by mass. When the content of the skeleton-forming agent 14 is within this range, the use of the skeleton-forming agent 14 can be more reliably effective. The skeleton-forming agent 14 can function satisfactorily when the content of the skeleton-forming agent 14 is 3.0% by mass or more based on the total content of solids in the negative electrode active material 13, the skeleton-forming agent 14, the conductive aid 15, and the binder 16. A reduction in energy density can be more effectively prevented when the content of the skeleton-forming agent 14 is 40.0% by mass or less. The content of the skeleton-forming agent 14 is more preferably 5.0 to 30.0% by mass.

In the negative electrode 1 according to this embodiment for use in a non-aqueous electrolyte secondary battery, the skeleton-forming agent 14 is at least, located in pores of the current collector 11 and at the interface between the current collector 11 and the first and second negative electrode materials 12 and 19. More specifically, the skeleton-forming agent 14 is net only located at the interface between the current collector 11 and the negative electrode material 12 but also uniformly located throughout the whole of the current collector 11 and the whole of the first negative electrode material 12, and the skeleton-forming agent 14 is dispersed between particles of the negative electrode active material 13. On the other hand, the conventional negative electrode for use in a non-aqueous electrolyte secondary battery contains a skeleton-forming agent localized at the surface of the negative electrode material.

The negative electrode 1 according to this embodiment for use a lithium-ion secondary battery further includes a conductive aid 15 in the first region 17. The conductive aid 15 may be any material having electron conductivity, such as metal, a carbon material, an electrically-conductive polymer, or electrically-conductive glass. Examples of the conductive aid 15 include acetylene black (AB), Ketjen black (KB), furnace black (FB), thermal black, lamp black, channel black, roller black, disc black, carbon black (CB), carbon fibers (e.g., vapor grown carbon fibers (VGCF®)), carbon nanotubes (CNTs), carbon nanohorns, graphite, graphene, glassy carbon, and amorphous carbon. One or more of these materials may be used.

The content of the conductive aid 15 is preferably 0 to 20.0% by mass when the total amount of the negative electrode active material 13, the conductive aid 15, and the binder 16 in the first negative electrode material 12 is normalized to 100% by mass. When the content of the conductive aid 15 is within this range, the conductivity can be increased without reducing the negative electrode capacity density, and a space for holding a sufficient amount of the skeleton-forming agent 14 can be formed in the first negative electrode material 12. The content of the conductive aid 15 is more preferably 8.8 to 25.0% by mass.

In this embodiment, the conductive aid 15 preferably has a bulk density of 0.04 to 0.25 mg/cm$^3$. When the conductive aid 15 has a bulk density within this range, a sufficient amount of the skeleton-forming agent 14 can be infiltrated, so that the skeleton-forming agent 14 can produce its effect sufficiently. The conductive aid 15 more preferably has a bulk density of 0.04 and 0.15 mg/cm$^3$.

The negative electrode 1 according to this embodiment for use in a lithium-ion secondary battery contains a binder 16 in the first region 17. Examples of the binder 16 include polyvinylidene fluoride (PVdF), polytetrafluoroethylene (PTFE), polyimide (PI), polyamide/polyamide imide, aramid, polyacrylic, styrene-butadiene rubber (SBR), ethylene-vinyl acetate copolymer (EVA), styrene-ethylene-butylene-styrene copolymer (SEBS), carboxymethyl cellulose (CMC), xanthane gum, polyvinyl alcohol (PVA), ethylene vinyl alcohol, polyvinyl butyral (PVB), ethylene vinyl alcohol, polyethylene (PE), polypropylene (PP), polyacrylic acid, lithium polyacrylate, sodium polyacrylate, potassium polyacrylate, ammonium polyacrylate, poly(methyl acrylate), poly(ethyl acrylate), polyacrylic acid amine, polyacrylic acid ester, epoxy resin, polyethylene terephthalate (PET), polybutylene terephthalate (PBT), nylon, vinyl chloride, silicone rubber, nitrile rubber, cyanoacrylate, urea resin, melamine resin, phenolic resin, latex, polyurethane, silylated urethane, nitrocellulose, dextrin, polyvinylpyrrolidone, vinyl acetate, polystyrene, chloropropylene, resorcinol resin, polyaromatic, modified silicone, methacrylic resin, polybutene, butyl rubber, 2-propenoic acid, cyanoacrylic acid, methyl methacrylate, glycidyl methacrylate, acrylic oligomer, 2-hydroxyethyl acrylate, alginic acid, starch, lacquer, sucrose, glue, casein, cellulose nanofibers, and other organic materials. One of these materials may be used alone, or two or more of these materials may be used in combination.

A mixture of any of the organic binders and an inorganic binder may also be used, the inorganic binder may be a silicate binder, a phosphate binder, a sol binder, or a cement binder. Examples of the inorganic binder include lithium silicate, sodium silicate, potassium silicate, cesium silicate, guanidine silicate, ammonium silicate, fluorosilicate, borate, lithium aluminate, sodium aluminate, potassium aluminate, aluminosilicate, lithium aluminate, sodium aluminate, potassium aluminate, aluminum polychloride, aluminum polysulfate, aluminum polysulfate silicate, aluminum sulfate, aluminum nitrate, ammonium alum, lithium alum, sodium alum, potassium alum, chromium alum, iron alum, manganese alum, ammonium nickel sulfate, diatom earth, polyzirconoxane, polytantaloxane, mullite, white carbon, silica sol, colloidal silica, fumed silica, alumina sol, colloidal alumina, fumed alumina, zirconia sol, colloidal zirconia, fumed zirconia, magnesia sol, colloidal magnesia, fumed magnesia, calcia sol, colloidal calcia, fumed calcia, titania sol, colloidal titania, fumed titania, zeolite, silicoaluminophosphate zeolite, sepiolite, montmorillonite, kaolin, saponite, aluminum phosphate, magnesium phosphate, calcium phosphate, iron phosphate, copper phosphate, zinc phosphate, titanium phosphate, manganese phosphate, barium phosphate, tin phosphate, low-melting point glass, plaster, gypsum, magnesium cement, litharge cement, Portland cement, blast furnace cement, fly ash cement, silica cement, phosphate cement, concrete, solid electrolytes, and other inorganic materials. One of these materials may be used alone, or two or more of these materials may be used in combination.

In this embodiment, the second negative electrode material 19 including the skeleton-forming agent 14 is used to form the interface layer, which allows strong bonding between the negative electrode active material 13 and the skeleton-forming agent 14. Therefore, all types of the binder 16 mentioned above can be used in this embodiment. The content of the binder 16 is preferably 0.1 to 60% by mass when the total amount of the negative electrode active material 13, the conductive aid 15, and the binder 16 in the first negative electrode material 12 is normalized to 100% by mass. When the content of the binder 16 is within this range, the ionic conductivity can be increased without reducing the negative electrode capacity density, and high mechanical strength and better cycle life characteristics can be obtained. The content of the binder 16 is more preferably 0.5 to 30% by mass.

The negative electrode 1 according to this embodiment for use in a non-aqueous electrolyte secondary battery has a pair of first regions 17 located in the two outer portions of the current collector 11 in the thickness direction of the current collector 11 and containing the first negative electrode material 12 and the second negative electrode material 19 (hereinafter also simply referred to as the "first region"); and a second region 16 located at the center in the thickness direction of the current collector 11 and containing the second negative electrode material 19 but not containing the first negative electrode material 12 (hereinafter also simply referred to as the "second region" or "central space layer"). According to this feature, the skeleton-forming agent 14 can be infiltrated into the interior of the current collector 11 from the first region 17 and infiltrated into the first region 17 from the second region 18 when the second negative electrode material 19 including the skeleton-forming agent 14 is applied over the current collector 11 in the process of producing the negative electrode 1 for use in a non-aqueous electrolyte secondary battery. This means that a sufficient amount of the skeleton-forming agent 14 can be infiltrated throughout the interior of the current collector 11. The sufficient infiltration of the skeleton-forming agent 14 throughout the interior of the current collector 11 makes it possible to prevent structural degradation of the interior of the negative electrode and to improve cycle durability. The second region 18, located at the center in the thickness direction of the current collector and containing the second negative electrode material 19 but not containing the first negative electrode material 12, preferably has a thickness equal to 0.5 to 15% of the overall thickness of the electrode. The second region 18 more preferably has a thickness of 5 to 100 μm.

The negative electrode 1 according to this embodiment having the features described above for use in a non-aqueous electrolyte secondary battery preferably has a thickness of 50 μm to 1,000 μm. When the negative electrode 1 for use in a non-aqueous electrolyte secondary battery has a thickness within this range, durability degradation can be reduced, and energy density can be increased, as compared to the conventional art. The negative electrode 1 for use in a non-aqueous electrolyte secondary battery more preferably has a thickness of 150 μm to 800 μm.

In the negative electrode 1 according to this embodiment for use in a non-aqueous electrolyte secondary battery, the distance between the current collector 11 including the porous metal body and the negative electrode active material 13 is preferably 50 μm or less. Durability degradation can be kept at a low level when the distance between the current collector 11 including the porous metal body and the negative electrode active material 13 is 50 μm or less. The distance between the current collector 11 including the porous metal body and the negative electrode active material 13 is more preferably 30 μm or less.

Positive Electrode

Next, a positive electrode for use with the negative electrode described above in forming a lithium-ion secondary battery will be described. Any positive electrode active material commonly used for lithium-ion secondary batteries may be used. The positive electrode active material may be, for example, an alkali metal transition metal oxide, a vanadium-based material, a sulfur-based material, a solid solution material (e.g., lithium excess material, sodium excess material, potassium excess material), a carbon-based material, or an organic material.

The positive electrode according to this embodiment for use in a lithium-ion secondary battery may contain a skeleton-forming agent as the negative electrode does. Such a skeleton-forming agent may be the same as that described above for the negative electrode, and the preferred content of such a skeleton-forming agent may also be the same as that for the negative electrode.

The positive electrode according to this embodiment for use in a lithium-ion secondary battery may contain a conductive aid. The conductive aid may be any of the various conductive aids shown above available for the negative electrode. The preferred content of the conductive aid may also be the same as that for the negative electrode.

The positive electrode according to this embodiment for use in a lithium-ion secondary battery may contain a binder. Examples of the binder include polyvinylidene fluoride (PVdF), polytetrafluoroethylene (PTFE), hexafluoropropylene, tetrafluoroethylene, polyacrylic, alginic acid, and other organic materials. One of these materials may be used alone, or two or more of these materials may be used in combination. The binder may also be a mixture of any of these organic binders and an inorganic binder. The inorganic binder may be, for example, a silicate binder, a phosphate binder, a sol binder, or a cement binder.

The current collector for use in the positive electrode may be any type having electron conductivity and being capable of conducting electricity to the positive electrode material held therein. The current collector may be made of an electrically-conductive material, such as C, Ti, Cr, Ni, Cu, Mo, Ru, Rh, Ta, W, Os, Ir, Pt, Au, or Al, or an alloy of two or more of these electrically-conductive materials (e.g., stainless steel, Al—Fe alloy). A material other than the electrically-conductive materials shown above may also be used, such as a multilayer-structure material including different metals, such as Fe and Al coated thereon, or including different elements, such as Al and C coated thereon. The current collector is preferably made of C, Ti, Cr, Au, Al, or stainless steel for high electrical conductivity and high stability in an electrolytic solution, and preferably made of C, Al, or stainless steel for oxidation resistance and material cost saving. The current collector is more preferably made of a carbon-coated Al material, an Al alloy, or a carbon-coated stainless-steel material.

The current collector for use in the positive electrode may be linearly-shaped, rod-shaped, plate-shaped, foil-shaped, or porous. In particular, the current collector may be porous so that a high filling density can be achieved and the skeleton-forming agent can be easily infiltrated into the active material layer. The porous current collector may be a mesh, a woven fabric, a nonwoven fabric, an embossed body, a punched body, an expanded body, or a foamed body. The current collector may include the same porous metal body as that for the negative electrode.

Separator

In the lithium-ion secondary battery according to this embodiment, the separator may be one commonly used for lithium-ion secondary batteries. The separator may be, for example, a polyethylene microporous membrane, a polypropylene microporous membrane, a nonwoven glass fabric, a nonwoven aramid fabric, a polyimide microporous membrane, or a polyolefin microporous membrane.

Electrolyte

In the lithium-ion secondary battery according to this embodiment, the electrolyte may be one commonly used for lithium-ion secondary batteries. The electrolyte may be, for example, a liquid electrolyte including a solution of an electrolyte in a solvent, a gel electrolyte, a solid electrolyte, an ionic liquid, or a molten salt. As used herein, the term "liquid electrolyte" refers to a material in the form of a solution including a solvent and an electrolyte dissolved in the solvent.

In the lithium-ion secondary battery, the electrolyte must contain lithium ions as carriers for electrical conduction. Thus, the electrolyte salt is preferably a lithium salt although it may be any type used for lithium-ion secondary batteries. Such a lithium salt may be at least one selected from the group consisting of lithium hexafluorophosphate ($LiPF_6$), lithium perchlorate ($LiClO_4$), lithium tetrafluoroborate ($LiBF_4$), lithium trifluoromethanesulfonate ($LiCF_3SO_4$), lithium bis(trifluoromethanesulfonyl)imide ($LiN(SO_2CF_3)_2$), lithium bis(pentafluoroethanesulfonyl)imide ($LiN(SO_2C_2F_5)_2$), and lithium bisoxalate borate ($LiBC_4O_8$), or a combination of two or more selected from, the group.

The solvent for the electrolyte may be any type used for lithium-ion secondary batteries. The solvent may be, for example, at least one selected from the group consisting of propylene carbonate (PC), ethylene carbonate (EC), dimethyl carbonate (DMC), diethyl carbonate (DEC), ethyl methyl carbonate (EMC), γ-butyrolactone (GBL), methyl-γ-butyrolactone, dimethoxymethane (DMM), dimethoxyethane (DME), vinylene carbonate (VC), vinyl ethylene carbonate (EVC), fluoroethylene carbonate (FEC), and ethylene sulfite (ES), or a combination of two or more selected from the group.

The concentration of the liquid electrolyte (the concentration of the salt in the solvent) is preferably, but not limited to, 0.1 to 3.0 mol/L, more preferably 0.3 to 2.0 mol/L.

Ionic liquids and molten salts may be classified into pyridine compounds, alicyclic amine compounds, and aliphatic amine compounds according to cation type. A variety of ionic liquids or molten salts can be synthesized using these compounds in combination with anions (negative ions) whose type is selected appropriately. Examples of the cation source include imidazolium salts, pyridinium salts, and other ammonium compounds, phosphonium ion-containing compounds, and inorganic ion-containing compounds. Examples of available anion sources include halide ion-containing compounds, such as bromide ion-containing compounds and triflates, boron-containing compounds, such as tetraphenylborate, and phosphorus-containing compounds, such as hexafluorophosphate.

Ionic liquids or molten salts can be obtained by a known synthesis method using a cation, such as imidazolinium in combination with an anion, such as $Br^-$, $Cl^-$, $BF^{4-}$, $PF^{6-}$, $(CF_3SO_2)_2N^-$, $CF_3SO^{3-}$, or $FeCl^{4-}$. Ionic liquids or molten salts can function as liquid electrolytes even in the absence of an additional electrolyte.

The solid electrolyte may be classified into sulfides, oxides, hydrides, and organic polymers. Many of them are amorphous or crystalline materials each composed of a carrier salt and an inorganic derivative. The use of the solid electrolyte can eliminate the need to use a flammable aprotic organic solvent, which makes ignition or leakage of gas or liquid less likely to occur and is expected to achieve a highly safe secondary battery.

Production Method

Figure 3:
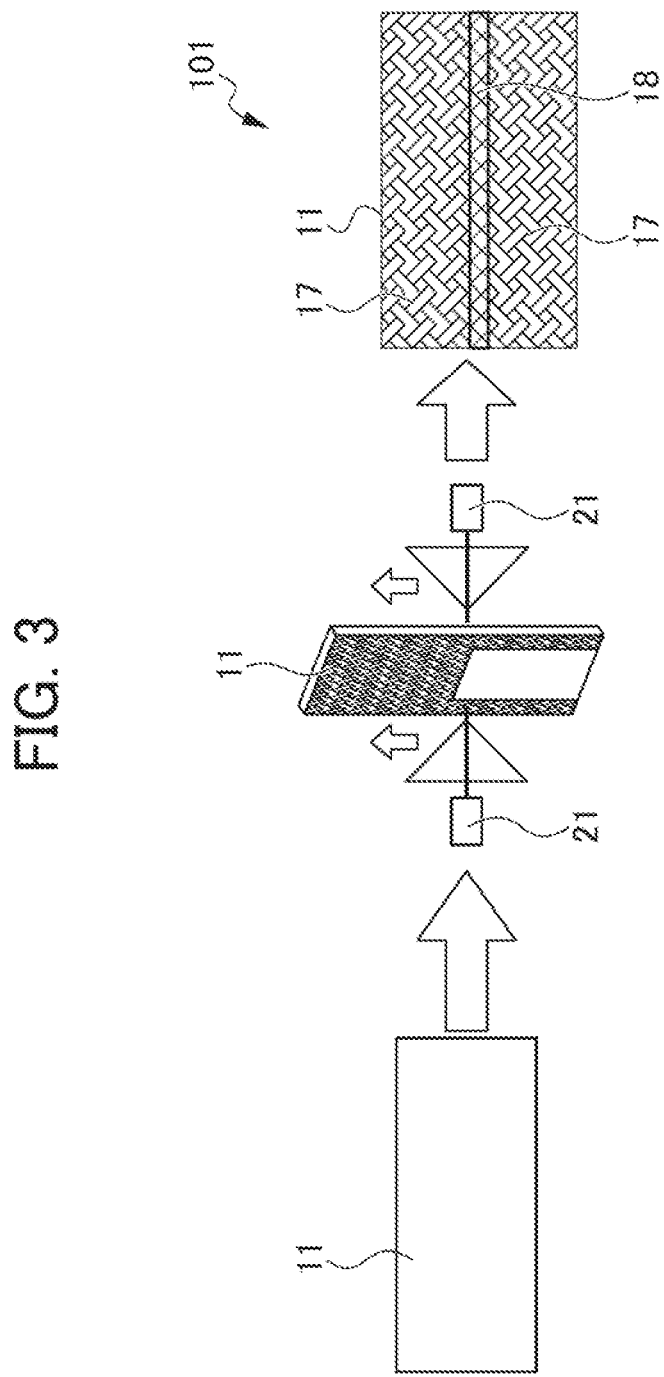
FIG. 3 is a schematic view showing a process according to the first embodiment of the present invention, which includes charging a negative electrode material into a current collector including a porous metal body to form a negative electrode layer precursor.

Next, a method for producing a lithium-ion secondary battery according to this embodiment will be described. A method for producing a negative electrode according to this embodiment for use in a lithium-ion secondary battery includes a first step including: providing a current collector having a pair of first regions and a second region, the pair of first regions being located in two outer portions of the current collector in the thickness direction of the current collector end being to contain a first negative electrode material and a second negative electrode material, the second region being located at the center in the thickness direction of the current collector and being to contain the second negative electrode material but not to contain the first negative electrode material; then applying a negative electrode material only to the first regions, the negative electrode material including a first negative electrode material including a negative electrode active material, a conductive aid, and a binder; and drying the negative electrode material to form a pair of first regions and a second region in the current collector, the pair of first regions being located in two outer portions of the current collector in the thickness direction of the current collector and containing the first negative electrode material, the second region being located at the center in the thickness direction of the current collector and containing the second negative electrode material but not containing the first negative electrode material. FIG. 3 shows an example of the first step. The first step includes, for example, producing a 1,000 µm-thick, porous nickel member; winding it into a roll in advance; and preparing a negative electrode material slurry including a first negative electrode material paste prepared by mixing a negative electrode active material, a binder, a conductive aid, and other components into N-methyl-2-pyrrolidone. The negative electrode material slurry including the first negative electrode material as prepared preferably has a viscosity of 5,000 to 30,000 mPa·s for its ability to be applied to and charged into the porous member. Subsequently, the negative electrode material slurry is charged into the porous nickel member by coating with a coater 21, dried, and then subjected to pressure adjustment to give a negative electrode layer precursor.

In this step, the negative electrode layer precursor may remain undried and wet. Besides the slurry coating, for example, chemical plating, sputtering, vapor deposition, gas deposition, dipping, or other methods may be used to form the negative electrode active material (precursor) layer integrally inside the porous current collector. In view of the liquid compatibility of the skeleton-forming agent and the electrode production cost, however, slurry charging and coating or dipping is preferred.

Figure 4:
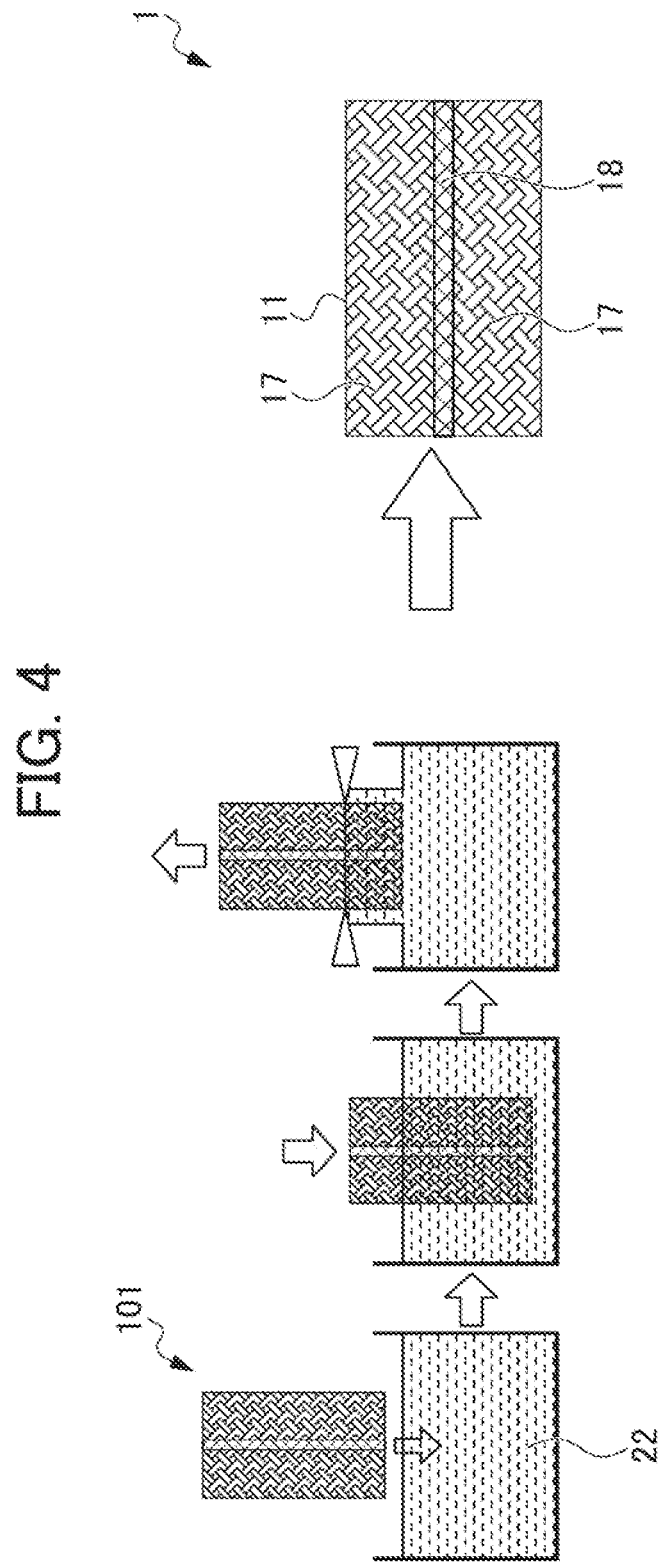
FIG. 4 is a view schematically showing a process according to the first embodiment of the present invention, which includes impregnating the negative electrode layer precursor shown in FIG. 1 with a skeleton-forming agent to form a negative electrode for use in a non-aqueous electrolyte secondary battery.

The method for producing the negative electrode according to this embodiment for use in a lithium-ion secondary battery also includes a second step including: impregnating, with a solution 22, the negative electrode layer precursor resulting from the first step, the solution 22 containing a second negative electrode material including a skeleton-forming agent including a siloxane bond-containing silicate or a phosphate bond-containing phosphate; and then subjecting the solution 22 to drying to cure the skeleton-forming agent and to form a negative electrode active material layer skeleton. For example, a siloxane bond-containing silicate or a phosphate bond-containing phosphate is purified by a dry or wet method and then mixed with water to form a negative electrode material solution (skeleton-forming agent solution) containing a second negative electrode material including the skeleton-forming agent. In this step, a surfactant may be added. The dry method may include, for example, adding $SiO_2$ to an aqueous solution of an alkali metal hydroxide; and then autoclaving the resulting solution at 150° C. to 250° C. to produce an alkali metal silicate. The wet method may include, for example, firing a mixture of an alkali metal carbonate compound and $SiO_2$ at 1,000° C. to 2,000° C.; and then dissolving the product in hot water. FIG. 4 show an example of the second step.

Subsequently, the skeleton-forming agent solution is applied to the surface of the negative electrode layer precursor to form a coating on the negative electrode active material. The skeleton-forming agent may be applied by a method of immersing the negative electrode layer precursor in the skeleton-forming agent solution stored in a tank, a method of adding the skeleton-forming agent dropwise to the surface of the negative electrode layer precursor to apply it, spray coating, screen printing, curtain coating, spin coating, gravure coating, or die coating. After being applied to the surface of the negative electrode layer precursor, the skeleton-forming agent infiltrates into the interior of the negative electrode to enter spaces between particles of the negative electrode active material and the first conductive aid. The skeleton-forming agent is then dried and cured by heat treatment. As a result, the skeleton-forming agent forms a negative electrode active material layer skeleton.

In this embodiment, a preferred method for applying the skeleton-forming agent to the negative electrode layer precursor includes immersing the whole of the negative electrode layer precursor in the skeleton-forming agent solution to impregnate the whole of the second region with the skeleton-forming agent solution. It is expected that when the precursor is immersed in the skeleton-forming agent solution in a tank, capillarity will act to allow the skeleton-forming agent to more easily infiltrate from the second region to the first region. A more preferred method for application includes immersing first a smallest cross-section side of the second region in the skeleton-forming agent solution before the whole of the negative electrode layer precursor is immersed in the skeleton-forming agent solution. It may maximize the effect of capillarity. An excess of the skeleton-forming agent solution remaining on the surface of the negative electrode layer precursor should preferably be removed after the impregnation.

The heat treatment is preferably carried out at 80° C. or more, more preferably at 100° C. or more, even more preferably at 110° C. or more, in which the higher the temperature, the shorter can be the duration of the treatment and the higher strength can be achieved from the skeleton-forming agent. The heat treatment temperature may have any upper limit as long as the current collector will not melt at the treatment temperature. For example, it may be up to about 1,000° C., which corresponds to the melting point of copper. For the conventional electrode, the upper limit of the treatment temperature is set much lower than 1,000° C. since the binder may carbonize or the current collector may soften. In this embodiment, however, the use of the skeleton-forming agent makes it possible to set the upper limit of the treatment temperature at 1,000° C. because the skeleton-forming agent exhibits high heat resistance and a strength higher than that of the current collector.

The heat treatment may be carried out by maintaining the temperature for 0.5 to 100 hours. While the atmosphere in which the heat treatment is carried out may be the air, the heat treatment is preferably carried out in a non-oxidizing atmosphere for preventing oxidation of the current collector.

In the method for producing the negative electrode according to this embodiment for use in a lithium-ion secondary battery, B/A may be controlled to satisfy 0.9<B/A<1.4, in which A is the density of the negative electrode layer precursor formed in the first step, B is the density of the negative electrode layer formed in the second step, and B/A is the ratio of the density B to the density A. Specifically, the material type, the material quantity, and the treatment conditions may be selected to allow the ratio B/A of the negative electrode layer density B to the negative electrode layer precursor density A (namely, the rate of increase in density) to fall within the range. Under this condition, the skeleton-forming agent can infiltrate throughout the interior of the negative electrode layer and thus can be disposed also at the interface with current collector in the negative electrode layer. As a result, the skeleton-forming agent can uniformly form a skeleton over the interior of the negative electrode layer to provide high mechanical strength and improved cycle life characteristics.

In the method for producing the negative electrode according to this embodiment for use in a lithium-ion secondary battery, the negative electrode layer precursor formed in the first step may have a density A of 0.5 to 2.0 g/cm$^3$. In this case, the ratio B/A of the negative electrode layer density B to the negative electrode layer precursor density A (namely, the rate of increase in density) can be more reliably kept within the range to enhance the effect of the skeleton-forming agent. The negative electrode layer precursor more preferably has a density A in the range of 0.6 to 1.5 g/cm$^3$. When the negative electrode layer precursor has a density A of 0.6 g/cm$^3$ or more, the reduction in electrode density can be kept low so that the reduction in energy density can be kept low. When the negative electrode layer precursor has a density A of 1.5 g/cm$^3$ or less, the reduction in capacity can be kept low.

The positive electrode for use in a lithium-ion secondary battery according to the present invention may be produced by a process including: applying, to a current collector, a positive electrode material including a positive electrode active material, a conductive aid, and a binder; then drying the positive electrode material; and then subjecting the positive electrode material to rolling. For example, a 10 μm-thick, rolled aluminum foil may be produced and wound into a roll in advance, while a paste slurry including a mixture of a positive electrode active material, a binder, a conductive aid, and other components is prepared as a positive electrode material. Subsequently, the positive electrode material slurry may be applied to the aluminum surface, dried, and then subjected to roll pressing to form a positive electrode. Alternatively, a foamed metal porous body may be used as the current collector. The electrode material mixture may be charged into the current collector. Any method may be used to charge the electrode material mixture into the current collector. For example, a pressure injection method may be used, in which a slurry including the electrode material mixture is charged under pressure into the network structure of the current collector. The current collector filled with the electrode material mixture may be dried and then subjected to pressing for increasing the density of the electrode material mixture to a desired level.

Finally, the resulting negative and positive electrodes may each be cut into a desired size and then joined with a separator placed between them. The joined product may be immersed in a liquid electrolyte and hermetically sealed to form a lithium-ion secondary battery. The lithium-ion secondary battery may have any existing form or structure, such as a multilayer battery or a wound battery.

Advantageous Effects

This embodiment produces advantageous effects as shown below. A negative electrode according to this embodiment for use in a non-aqueous electrolyte secondary battery includes a current collector 11 including a porous metal body; a first negative electrode material 12 disposed in pores of the porous metal body and including a negative electrode active material 13, a conductive aid 15, and a binder 16, in which the negative electrode active material 13 includes a silicon-based material; and a second negative electrode material 19 disposed in pores of the porous metal body and including a skeleton-forming agent 14 including a silicate having a siloxane bond. The negative electrode has a pair of first regions 17 and a second region 18, in which the pair of first regions 17 are each located in each outer portion of the current collector 11 in the thickness direction of the current collector 11 and each contain the first negative electrode material 12 and the second negative electrode material 19, and the second region 18 is located at the center in the thickness direction of the current collector 11 and contains the second negative electrode material 19 but does not contain the first negative electrode material 12.

The porous metal body used as the current collector 11 has a porous metal skeleton with micro-sized regions in which the first negative electrode material 12 can be fixed so that delamination and cracking can be prevented in the negative electrode. The use of the second negative electrode material 19 including the skeleton-forming agent 14 also makes it possible to fix the first negative electrode material 12 in nano-sized regions. More specifically, the skeleton-forming agent 14 can form a third phase at the interface between the negative electrode active material 13 and the current collector 11 including the porous metal body, which can strongly bond particles of the negative electrode active material 13 together in the first negative electrode material 12 to prevent them from coming off during expansion and contraction and to prevent battery structure degradation. The current collector 11 has the pair of first regions 17, which are located in two outer portions in its thickness direction and each contain the first and second negative electrode materials; and the second region 13, which contains the second negative electrode material but does not contain the first negative electrode material. This feature allows the second negative electrode material 19 including the skeleton-forming agent 14 to infiltrate not only from the first region 17 into the interior of the current collector 11 but also from the second region 13 into the first region 17. Thus, a sufficient amount of the second negative electrode material 19 including the skeleton-forming agent 14 can infiltrate throughout the interior of the current collector 11 to prevent negative electrode structure degradation and improve cycle durability. The current collector 11 having the first and second regions 17 and 13 allows a sufficient amount of the second negative electrode material 19 including the skeleton-forming agent 14 to infiltrate throughout the interior of the negative electrode, which makes it possible to maintain the negative electrode structure even when full charge and discharge cycles with a SOC from 0 to 100% are performed, even though the negative electrode active material 13 includes the silicon-based material, which has a high capacity and a very high coefficient of expansion and contraction. As a result, the structural degradation of the negative electrode can be prevented, which would otherwise be caused by delamination or conduction path breakage when the negative electrode is made thick to have high capacity or large weight per unit area, so that high cycle durability can be achieved.

Second Embodiment

A negative electrode according to another embodiment (hereinafter also referred to as a second embodiment) of the present invention for use in a non-aqueous electrolyte secondary battery includes a current collector including a porous metal body; a first negative electrode material disposed in pores of the porous metal body and including a conductive aid; a second negative electrode material disposed in pores of the porous metal body and including a binder, a conductive aid, and a negative electrode active material including a silicon-based material; and a third negative electrode material disposed in pores of the porous metal body and including a skeleton-forming agent including a silicate having a siloxane bond. The negative electrode has a pair of first regions and a second region, in which the pair of first regions are each located in each outer portion of the current collector in the thickness direction of the current collector and each contain the first negative electrode material, the second negative electrode material, and the third negative electrode material, end the second region is located at the center in the thickness direction of the current collector and contains the first negative electrode material and the third negative electrode material but does not contain the second negative electrode material. The second embodiment will also be described with reference to the drawings.

Negative Electrode

Figure 2:
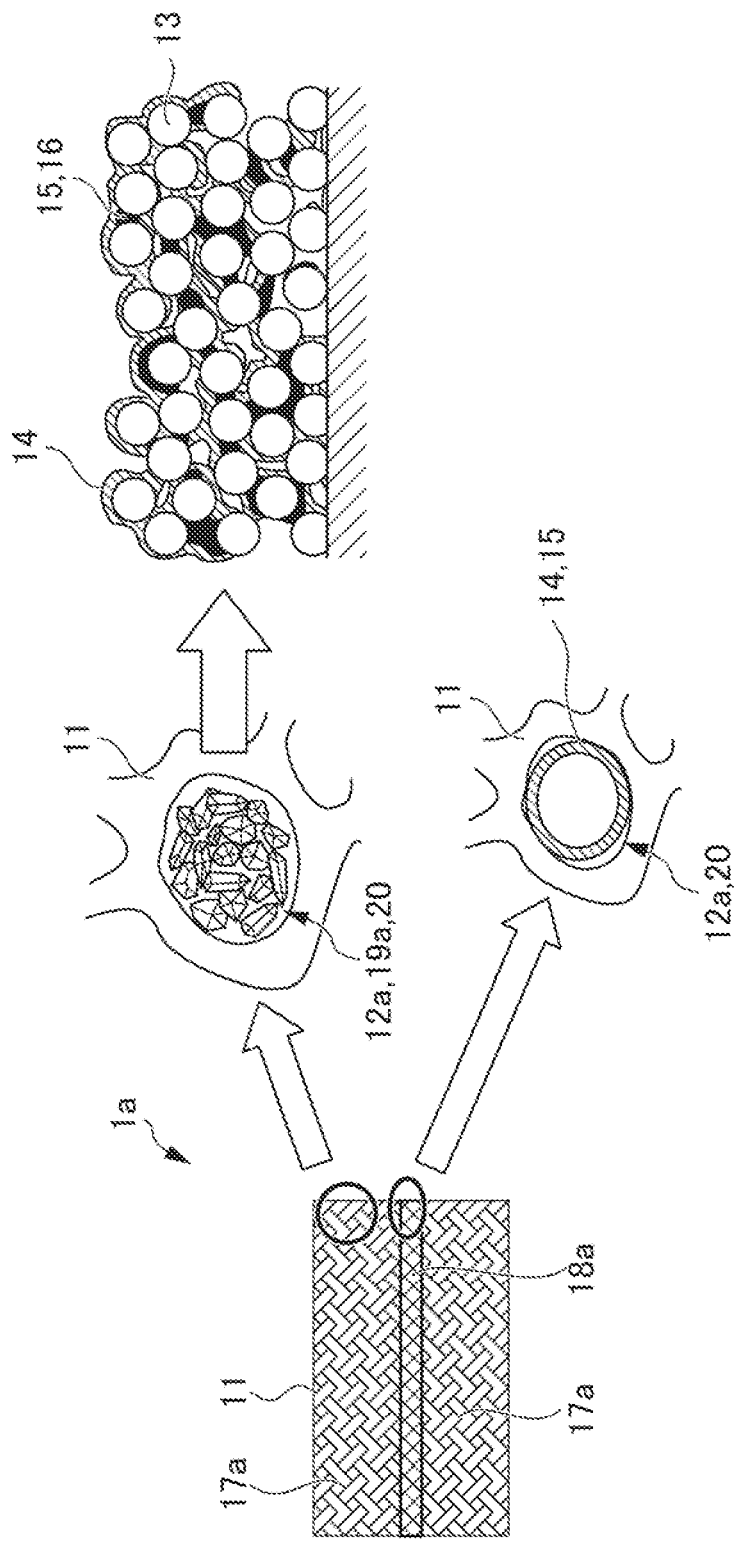
FIG. 2 is a view schematically showing the structure of a negative electrode according to a second embodiment of the present invention for use in a non-aqueous electrolyte secondary battery.

As shown in FIG. 2, the negative electrode 1a according to this embodiment for use in a non-aqueous electrolyte secondary battery includes a current collector 11, a first negative electrode material 12a, a second negative electrode material 19a, and a third negative electrode material 20. The current collector 11 includes a porous metal body. The first negative electrode material 12a is disposed in pores of the porous metal body and includes a conductive aid 15. The second negative electrode material 19 is disposed in pores of the porous metal body and includes a negative electrode active material 13 including a silicon-based material; a conductive aid 15; and a binder 16. The third negative electrode material 20 is disposed in pores of the porous metal body and includes a skeleton-forming agent 14 including a silicate having a siloxane bond. The negative electrode 1a according to this embodiment for use in a non-aqueous electrolyte secondary battery has a pair of first regions 17a and a second region 18a. The pair of first regions 17a are located in the two outer portions of the current collector 11 in the thickness direction of the current collector 11 and contain the first negative electrode material 12a, the second negative electrode material 19a, and the third negative electrode material 20. The second region 18a is located at the center in the thickness direction of the current collector 11 and contains the first negative electrode material 12a and the third negative electrode material 20 but does not contain the second negative electrode material 19a. For example, when this embodiment is applied to a negative electrode for use in a lithium-ion secondary battery, the skeleton-forming agent can be highly infiltrated in the current collector including a porous metal body, which makes it possible to provide a negative electrode that is for use in a lithium-ion secondary battery, is far less likely to suffer from structural degradation, and provides an improved level of cycle durability, and also makes it possible to provide a lithium-ion secondary battery including such a negative electrode. Hereinafter, examples in which this embodiment is applied to a negative electrode for use in a lithium-ion secondary battery will be described in detail. It will be understood that a variety of additions, modifications, or deletions may be made with respect to such examples without departing from the gist of the present invention.

The negative electrode 1a according to this embodiment for use in a non-aqueous electrolyte secondary battery has a pair of first regions 17a located in the two outer portions of the current collector 11 in the thickness direction of the current collector 11 and containing the first negative electrode material 12a, the second negative electrode material 19a, and the third negative electrode material 20 (hereinafter also simply referred to as the "first region"); and a second region 13a located at the center in the thickness direction of the current collector 11 and containing the first negative electrode material 12a and the third negative electrode material 20 but does not contain the second negative electrode material 19a (hereinafter also simply referred to as the "second region" or "central space layer"). According to this feature, the skeleton-forming agent 14 can be infiltrated into the interior of the current collector 11 from the first region 17a and infiltrated into the first region 17a from the second region 18a when the third negative electrode material 20 including the skeleton-forming agent 14 is applied over the current collector 11 in the process of producing the negative electrode 1a according to this embodiment for use in a non-aqueous electrolyte secondary battery. This means that a sufficient amount of the skeleton-forming agent 14 can be infiltrated throughout the interior of the current collector 11. The sufficient infiltration of the skeleton-forming agent. 14 throughout the interior of the current collector 11 makes it possible to prevent structural degradation of the interior of the negative electrode more effectively and to improve cycle durability more effectively. The second region 13a, located at the center in the thickness direction of the current collector 11 and containing the first negative electrode material 12a and the third negative electrode material 20 but not containing the second negative electrode material 19a, preferably has a thickness equal to 0.5 to 15% of the overall thickness of the electrode. The second region 18a more preferably has a thickness of 5 to 100 μm.

In this embodiment, the first negative electrode material 12a including the conductive aid 15 is preferably disposed in the first region 17a and the second region 13a of the current collector 11. In this embodiment, the conductive aid 15 in the first negative electrode material 12a, which may be that in the first embodiment, is preferably a fibrous carbon material or a material having a DBP (dibutyl phthalate) oil absorption of 200 mL/g or more according to JIS K 6217-4. The conductive aid 15 having such a property is a porous material with a large specific surface area and a high ability to absorb liquid. The current collector containing the conductive aid 15 with such a property (the negative electrode layer precursor) can more absorb the skeleton-forming agent 14 when the third negative electrode material 20 including the skeleton-forming agent 14 is applied to the current collector than when the second negative electrode material including the skeleton-forming agent 14 is applied to the current collector according to the first embodiment (negative electrode layer precursor). This may be because the conductive aid 15 in the current collector can produce stronger capillarity to improve the ability to disperse or infiltrate the third negative electrode material 20 including the skeleton-forming agent 14 throughout the interior of the current collector 11. Examples of the conductive aid 15 that may be contained in the first negative electrode material according to this embodiment include acetylene black (AB), Ketjen black (KB), furnace black (FB), thermal black, lamp black, channel black, roller black, disc black, carbon black (CB), carbon fibers (e.g., vapor grown carbon fibers (VGCF®)), carbon nanotubes (CNTs), carbon nanohorns, graphite, graphene, glassy carbon, and amorphous carbon. One or more of these materials may be used.

The conductive aid 15 in the first negative electrode material preferably has a weight per unit area of 0.1 to 1.0 mg/cm$^2$. When the weight of the conductive aid 15 in the first negative electrode material is within this range, the conductive aid 15 can be more reliably effective.

The total content of the conductive aid 15 in the first and second negative electrode materials 12a and 19a is preferably 0 to 20.0% by mass when the total amount of the negative electrode active material 13, the conductive aid 15, and the binder 16 in the first and second negative electrode materials 12a and 19a is normalized to 100% by mass. When the content of the conductive aid 15 is within this range, the conductivity can be increased without reducing the negative electrode capacity density, a space for holding a sufficient amount of the skeleton-forming agent 14 can be formed in the current collector 11, and capillarity can be produced to increase the ability to infiltrate the skeleton-forming agent into the interior of the current collector.

In this embodiment, the conductive aid 15 preferably has a bulk density of 0.04 to 0.25 mg/cm$^3$. When the conductive aid 15 has a bulk density within this range, a sufficient amount of the third negative electrode material 20 including the skeleton-forming agent 14 can be infiltrated into the current collector 11 with the aid of capillarity, so that the skeleton-forming agent 14 can produce its effect sufficiently. The conductive aid 15 more preferably has a bulk density of 0.04 and 0.15 mg/cm$^3$.

The content (density) of the skeleton-forming agent 14 is preferably 0.5 to 2.0 mg/cm$^2$ based on the total weight of the first, second, and third negative electrode materials 12a, 19a, and 20. When the content of the skeleton-forming agent 14 is within this range based on the total weight of the first, second, and third negative electrode materials 12a, 19a, and 20, the use of the skeleton-forming agent 14 can be more reliably effective.

The content of the skeleton-forming agent 14 is preferably 3.0 to 40.0% by mass when the total content of solids in the negative electrode active material 13, the skeleton-forming agent 14, the conductive aid 15, and the binder 16 in the first, second, and third negative electrode materials 12a, 19a, and 20 is normalized to 100% by mass. When the content of the skeleton-forming agent 14 is within this range, the use of the skeleton-forming agent 14 can be more reliably effective. The skeleton-forming agent 14 can function satisfactorily when the content of the skeleton-forming agent 14 in the negative electrode material 12 is 3.0% by mass or more. A reduction in energy density can be more effectively prevented when the content of the skeleton-forming agent 14 is 40.0% by mass or less. The content of the skeleton-forming agent 14 is more preferably 5.0 to 30.0% by mass.

In this embodiment, the third negative electrode material 20 including the skeleton-forming agent 14 is used to form the interface layer, which allows strong bonding between the negative electrode active material 13 and the skeleton-forming agent 14. Therefore, all types of the binder 16 shown for the first embodiment can be used in this embodiment. The content of the binder 16 is preferably 0.1 to 60% by mass when the total amount of the negative electrode active material 13, the conductive aid 15, and the binder 16 in the first and second negative electrode materials 12a and 19a is normalized to 100% by mass. When the content of the binder 16 is within this range, the ionic conductivity can be increased without reducing the negative electrode capacity density, and high mechanical strength and better cycle life characteristics can be obtained. The content of the binder 16 is more preferably 0.5 to 30% by mass.

Production Method

Next, a method for producing a lithium-ion secondary battery according to this embodiment will be described. A method for producing the negative electrode according to this embodiment for use in a lithium-ion secondary battery includes a first step including: applying, to a current collector, a conductive aid solution containing a first negative electrode material including a conductive aid; and subjecting the applied solution to drying to form an electrically-conductive path in the current collector. For example, a 1,000 μm-thick, porous nickel member may be produced and wound into a roll in advance, and a conductive aid solution containing the first negative electrode material may be prepared by dissolving or dispersing the conductive aid in N-methyl-2-pyrrolidone. Subsequently, the conductive aid solution containing the first negative electrode material is charged into the porous nickel member by coating, then dried, and then subjected to pressure adjustment to give a negative electrode layer precursor. In this step, the negative electrode layer precursor may remain undried and wet. The conductive aid solution containing the first negative electrode material including the conductive aid may be applied by slurry coating as shown above, a method of adding the conductive aid solution dropwise to the surface of the current collector to apply it, spray coating, screen printing, curtain coating, spin coating, gravure coating, or die coating. In view of the electrode production cost, however, slurry charging and coating or dipping is preferred.

Figure 5:
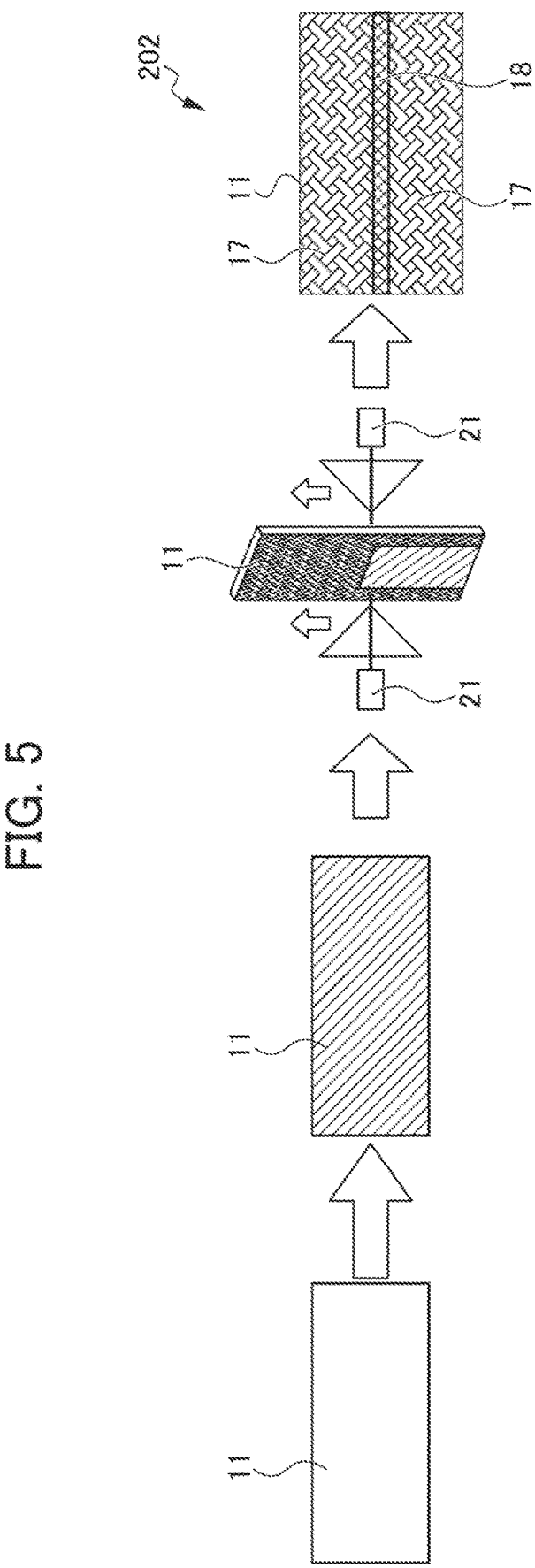
FIG. 5 is a schematic view showing a process according to the second embodiment of the present invention, which includes charging a second conductive aid into a current collector including a porous metal body; and then charging a negative electrode material into the current collector to form a negative electrode layer precursor.

The method for producing the negative electrode according to this embodiment for use in a lithium-ion secondary battery also includes a second step including: subjecting the negative electrode layer precursor formed in the first step to a treatment similar to that in the first step according to the first embodiment to form a pair of first regions and a second region in the current collector, in which the pair of first regions are located in two outer portions of the current collector in the thickness direction of the current collector and each contain the first and second negative electrode materials, and the second region is located at the center in the thickness direction of the current collector and contains the first negative electrode material but does not contain the second negative electrode material. FIG. 5 is a schematic view of the first and second steps according to this embodiment. As long as there is no problem, the first step according to the first embodiment is preferably employed as the second step for the production method according to this embodiment. Although the step will not; be described in detail, the features and methods according to the first embodiment are preferably employed for the details as long as there is no problem.

Figure 6:
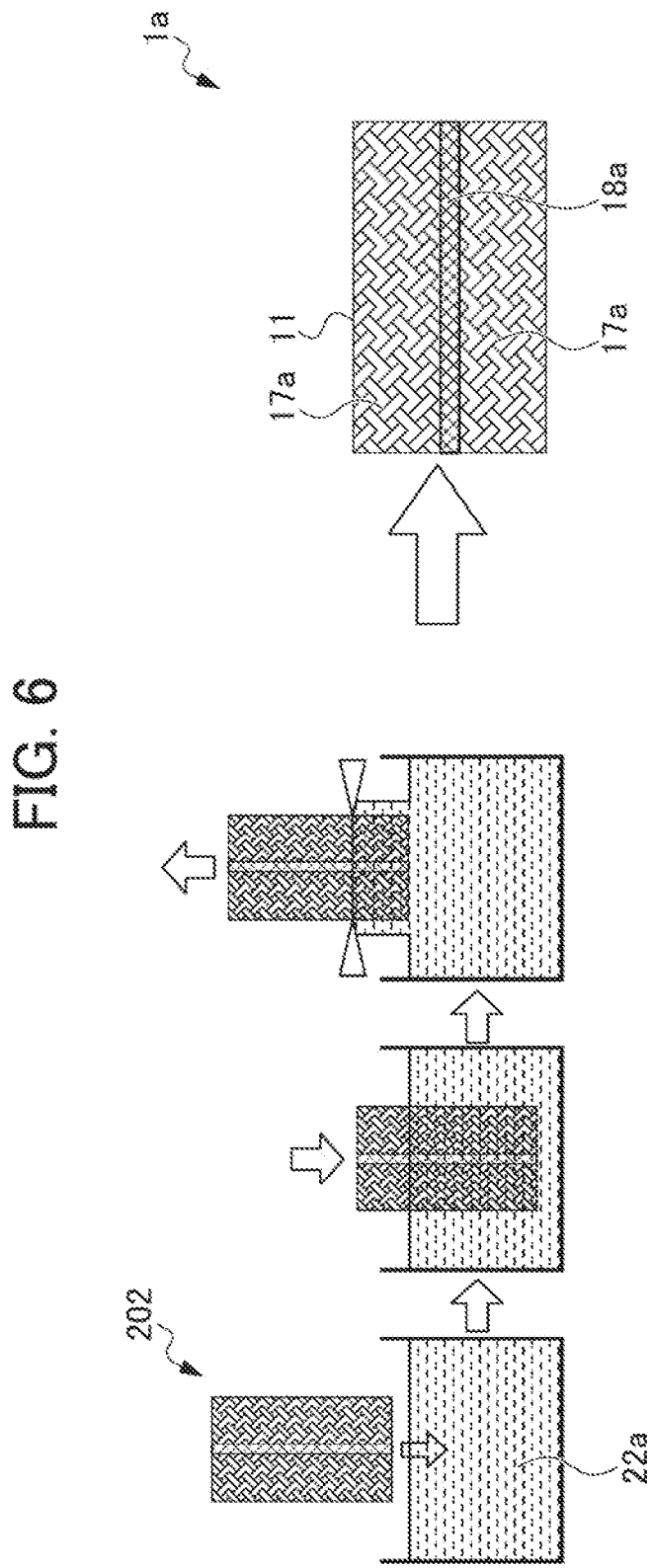
FIG. 6 is a view schematically showing a process according to the second embodiment of the present invention, which includes impregnating the negative electrode layer precursor shown in FIG. 2 with a skeleton-forming agent to form a negative electrode for use in a non-aqueous electrolyte secondary battery.

The method for producing the negative electrode according to this embodiment for use in a lithium-ion secondary battery also includes a third step including: impregnating the negative electrode layer precursor formed in the second step with a solution 22a containing a negative electrode material including a third negative electrode material including the skeleton-forming agent and drying the product in a manner similar to that in the second step according to the first embodiment to cure the skeleton-forming agent and form a negative electrode active material layer skeleton. FIG. 6 is a schematic view of the third step in this embodiment. As long as there is no problem, the second step according to the first embodiment is preferably employed as the third step for the production method according to this embodiment. Although the step will not be described in detail, the features and methods according to the first embodiment are preferably employed for the details as long as there is no problem. The same applies to the suitable method for applying the skeleton-forming agent. According to this embodiment, a non-aqueous electrolyte secondary battery may also be produced using the negative electrode according to this embodiment and the positive electrode according to the first embodiment.

Advantageous Effects

This embodiment produces advantageous effects as shown below. The negative electrode according to this embodiment includes a current collector including a porous metal body; a first negative electrode material disposed in pores of the porous metal body and including a conductive aid; a second negative electrode material disposed in pores of the porous metal body and including a binder, a conductive aid, and a negative electrode active material including a silicon-based material; and a third negative electrode material disposed in pores of the porous metal body and including a skeleton-forming agent including a silicate having a siloxane bond. The negative electrode has a pair of first regions and a second region, in which the pair of first regions are each located in each outer portion of the current collector in the thickness direction of the current collector and contain the first negative electrode material, the second negative electrode material, and the third negative electrode material, and the second region is located at the center in the thickness direction of the current collector and contains the first negative electrode material and the third negative electrode material but does not contain the second negative electrode material.

According to this embodiment, the current collector 11 has a pair of first regions and a second region, in which the pair of first regions are located in two outer portions in its thickness direction and contain the first, second, and third negative electrode materials, and the second region is located at the center in its thickness direction and contains the first negative electrode material including the conductive aid 15 and the third negative electrode material 20 but does not contain the second negative electrode material. In the negative electrode with such features, the skeleton-forming agent 14 is infiltrated into the first region 17 more effectively from the second region 18 due to capillarity than from other regions. Thus, a sufficient amount of the skeleton-forming agent 14 more effectively infiltrates throughout the interior of the current collector 11 to prevent negative electrode structure degradation and improve cycle durability more effectively. According to the second embodiment, the skeleton-forming agent 14 is infiltrated into the first region 17 from the second region 18 more effectively due to capillarity and from other regions. This makes it possible to maintain the negative electrode structure more effectively even when full charge and discharge cycles with a SOC from 0 to 100% are performed, even though the negative electrode active material 13 includes the silicon-based material, which has a high capacity and a very high coefficient of expansion and contraction. As a result, the structural degradation of the negative electrode can be more effectively prevented, which would otherwise be caused by delamination or conduction path breakage when the negative electrode is made thick to have high capacity or large weight per unit area, so that high cycle durability can be more successfully achieved.

It will be understood that the embodiments described above are not intended to limit the present invention and may be altered or modified as long as the object of the present invention can be achieved. For example, the non-aqueous electrolyte secondary battery is a secondary battery (electricity storage device) using a non-aqueous electrolyte, such as an organic solvent solution of an electrolyte, examples of which include not only lithium-ion secondary batteries but also sodium-ion secondary batteries, potassium-ion secondary batteries, magnesium-ion secondary batteries, calcium-ion secondary batteries, and other secondary batteries. The term "lithium-ion secondary battery" means a non-aqueous electrolyte secondary battery containing lithium ions as carriers for electrical conduction and not containing water as a main component. Examples include lithium-ion secondary batteries, metallic lithium batteries, lithium polymer batteries, all-solid-state lithium batteries, and air lithium-ion batteries. Examples may also include other secondary batteries. As used herein, the expression "not containing water as a main component" means that the electrolyte is not based on water. The electrolyte may be any known electrolyte used in non-aqueous electrolyte secondary batteries. Even when containing a slight amount; of water, such an electrolyte can function for secondary batteries. However, the content of water in the electrolyte should preferably be as low as possible since water has an adverse effect on the cycle characteristics, storage stability, and input/output characteristics of secondary batteries. In practice, the content of water in the electrolyte should preferably be 5,000 ppm or less.

EXAMPLES

Next, examples of the present invention will be described, which are not intended to limit the present invention.

Example 1 Preparation of Negative Electrode

A negative electrode material slurry was prepared including a first negative electrode material including silicon (in the form of particles with diameters of 1 to 3 μm) as a negative electrode active material, the conductive aid shown in Table 1, and polyvinylidene fluoride (PVdF) as a binder. Subsequently, the prepared slurry was charged into a pair of first regions of a current collector Nickel Celmet® manufactured by Sumitomo Electric Industries, Ltd., which were located in the two outer portions in the thickness direction of the current collector. In this case, the current collector had a 50 μm-wide second region at its center. Subsequently, the current collector filled with the slurry was subjected to drying and pressure adjustment, so that a negative electrode layer precursor was obtained having a pair of first regions and a second region in the current collector, in which the pair of first regions were located in the two outer portions in the thickness direction of the current collector and contained the first negative electrode material, and the second region was located at the center in the thickness direction of the current collector and did not contain the first negative electrode material.

Separately, an aqueous solution of 10% by mass of $Na_2O \cdot 3SiO_2$ was prepared as a skeleton-forming agent solution including a second negative electrode material including a skeleton-forming agent and water. The resulting negative electrode layer precursor was immersed in the prepared skeleton-forming agent solution. After the immersion, the negative electrode precursor was heated and dried at 160° C. to give a negative electrode of Example 1 having a negative electrode layer having: a pair of first regions located in the two outer portions in the thickness direction of the current collector and containing the first and second negative electrode materials; and a second region located at the center in the thickness direction of the current collector end containing the second negative electrode material but not containing the first negative electrode material.

Preparation of Positive Electrode $LiNi_{0.5}Co_{0.2}Mn_{0.3}O_2$ (in the form of particles with diameters of 5 to 15 μm) was provided as a positive electrode active material. A positive electrode material mixture slurry was prepared by mixing 94% by mass of the positive electrode active material, 4% by mass of carbon black as a conductive aid, and 2% by mass of polyvinylidene fluoride (PVdF) as a binder and dispersing the resulting mixture in an appropriate amount of N-methyl-2-pyrrolidone (NMP). An aluminum foam having a thickness of 1.0 mm, a porosity of 95%, 46 to 50 cells per inch, a pore diameter of 0.5 mm, and a specific surface area of 5,000 $m^2/m^3$ was provided as a current collector. The prepared positive electrode material mixture slurry was applied in an amount of 90 $mg/cm^2$ to the current collector by a pressure injection method. The slurry was dried under vacuum at 120° C. for 12 hours and then subjected to roll pressing under a pressure of 15 tons, so that a positive electrode for use in a lithium-ion secondary battery was obtained having pores of the aluminum foam filled with the electrode material mixture.

Preparation of Lithium-Ion Secondary Battery

A 25 μm-thick microporous membrane including a stack of three layers of polypropylene/polyethylene/polypropylene was provided as a separator. The membrane was punched into a piece of a size 100 mm in length and 90 mm in width. The resulting positive and negative electrodes were stacked in the order of positive electrode/separator/negative electrode/separator/positive electrode/negative electrode to form an electrode stack.

Subsequently, a tab lead was ultrasonically welded to the current collecting region of each of the electrodes. An aluminum laminate for secondary batteries was formed into a bag by heat sealing, and the electrode stack with the tab leads welded thereto was inserted in the bag to form a laminate cell. A solution of 1.2 mol $LiPF_6$ in a mixed solvent of ethylene carbonate, dimethyl carbonate, and ethyl methyl carbonate in a volume ratio of 3:4:3 was prepared as an electrolytic solution and then injected into the laminate cell, so that a lithium-ion secondary battery was obtained.

Example 2

A furnace black-containing slurry was prepared as an electrically-conductive solution containing a first negative electrode material including a conductive aid. The slurry was charged into the whole of a current collector Nickel Celmet® manufactured by Sumitomo Electric Industries, Ltd. and then subjected to drying end pressure adjustment. Subsequently, as in Example 1, a negative electrode material slurry was prepared including a second negative electrode material including silicon (in the form of particles with diameters of 1 to 3 μm) as a negative electrode active material, the conductive aid shown in Table 1, and polyvinylidene fluoride (PVdF) as a binder. The negative electrode material slurry was charged into a pair of first regions of the current collector Nickel Celmet® manufactured by Sumitomo Electric Industries, Ltd., which were located in the two outer portions in the thickness direction of the current collector. In this case, the current collector had a 50 μm-wide second region at its center. Subsequently, the current collector was subjected to drying and pressure adjustment, so that a negative electrode layer precursor was obtained having a pair of first regions and a second region in the current collector, in which the pair of first regions were located in the two outer portions in the thickness direction of the current collector and contained the first and second negative electrode materials, and the second region was located at the center in the thickness direction of the current collector and contained the first negative electrode material but did not contain the second negative electrode material.

A skeleton-forming agent solution (corresponding to a third negative electrode material) was prepared by the same procedure as that in Example 1. The negative electrode layer precursor was immersed in the skeleton-forming agent solution and then heated and dried at 160° C. to give a negative electrode of Example 2 having a negative electrode layer having: a pair of first regions located in the two outer portions in the thickness direction of the current collector and containing the first, second, and third negative electrode materials; and a second region located at the center in the thickness direction of the current collector and containing the first and third negative electrode materials but not containing the second negative electrode material.

A positive electrode of Example 2 was prepared as in Example 1 except that the amount of application was changed to 45 $mg/cm^2$. A battery was prepared as in Example 1.

Comparative Example 1

A negative electrode was prepared as in Examples 1 and 2 except that the region not filled with the negative electrode material (central space layer) was not formed, namely, the negative electrode material was applied throughout the whole of the current collector, in the process of preparing the negative electrode.

A positive electrode of Comparative Example 1 was prepared as in Example 1 except that the amount of application was changed to 45 $mg/cm^2$. A battery was prepared as in Example 1.

Aging Test

An aging test was performed on each of the batteries of Examples 1 and 2 and Comparative Example 1. In the aging test, the test environment temperature was 25° C.

Durability Test

A cycle life test was performed on each of the batteries of Examples 1 and 2 and Comparative Example 1. The cycle life test was performed at a test environment temperature of 25° C., a current density of 0.2 C rate, and a cut-off potential of 2.5 to 4.2 V.

TABLE 1

| | Current collector | Skeleton-forming agent | Amount of skeleton-forming agent coating (mg/cm²) | Composition | Electrode material mixture weight per unit area (mAh/cm²) | Electrode thickness (µm) | Second region thickness (µm) Conductive aid disposed in second region |
|---|---|---|---|---|---|---|---|
| Example 1 | Ni foam | $K_2O \cdot 3SiO_2$ | 1 | Active material/AB/PVdF = 90/5/5 (% by mass) | 15 | 545 | 50 — |
| Example 2 | Ni foam | $K_2O \cdot 3SiO_2$ | 1 | Active material/AB/PVdF = 90/5/5 (% by mass) | 15 | 550 | 50 Furnace black |
| Comparative Example 1 | Ni foam | $K_2O \cdot 3SiO_2$ | 1 | Active material/AB/PVdF = 90/5/5 (% by mass) | 15 | 505 | — — |

Note:
"—" indicates no settings for the item.

Figure 7:
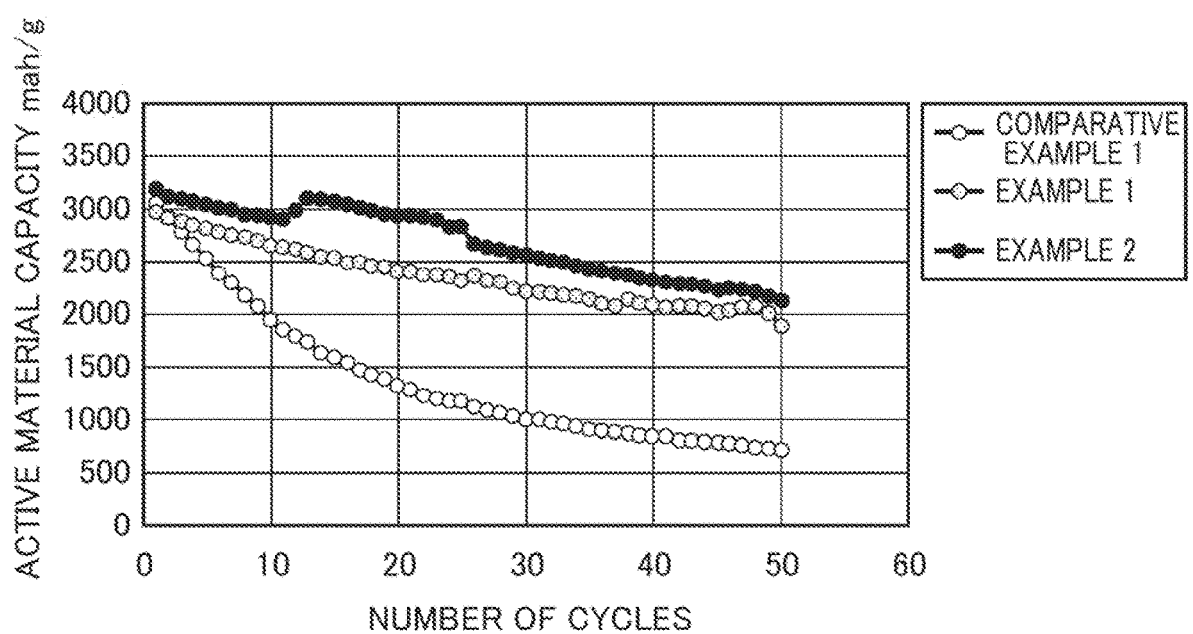
FIG. 7 is a graph showing the relationship between the number of cycles and the discharge capacity in Examples 1 and 2 and Comparative Example 1.

FIG. 7 is a graph showing the relationship between the number of cycles and the discharge capacity with respect to the batteries of Examples 1 and 2 and Comparative Example 1. FIG. 7 demonstrates that the examples of the present invention make it possible to obtain a negative electrode that is for use in a non-aqueous electrolyte secondary battery, is less likely to suffer from structural degradation, and provides improved cycle durability and to obtain a non-aqueous electrolyte secondary battery including such a negative electrode.

EXPLANATION OF REFERENCE NUMERALS 1, 1a: Negative electrode for use in non-aqueous electrolyte secondary battery
11: Current collector
101, 201, 202: Negative electrode layer precursor
12, 12a: First negative electrode material
13: Negative electrode active material
14: Skeleton-forming agent
15: Conductive aid
16: Binder
17, 17a: First region
18, 18a: Second region
19, 19a: Second negative electrode material
20: Third negative electrode material

What is claimed is:

1. A negative electrode for use in a non-aqueous electrolyte secondary battery, the negative electrode comprising:
a current collector comprising a porous metal body;
a first negative electrode material disposed in pores of the porous metal body and comprising a negative electrode active material, a conductive aid, and a binder, the negative electrode active material comprising a silicon-based material; and
a second negative electrode material disposed in pores of the porous metal body and comprising a skeleton-forming agent comprising a silicate having a siloxane bond,
the negative electrode having:
a pair of first regions each located in each outer portion of the current collector in a thickness direction of the current collector and containing the first negative electrode material and the second negative electrode material; and
a second region located at a center in the thickness direction of the current collector and containing the second negative electrode material but not containing the first negative electrode material.

2. A negative electrode for use in a non-aqueous electrolyte secondary battery, the negative electrode comprising:
a current collector comprising a porous metal body;
a first negative electrode material disposed in pores of the porous e al body and comprising a conductive aid;
a second negative electrode material disposed in pores of the porous metal body and comprising a binder and a negative electrode active material comprising a silicon-based material; and
a third negative electrode material disposed in pores of the porous metal body and comprising a skeleton-forming agent comprising a silicate having a siloxane bond,
the negative electrode having:
a pair of first regions each located in each outer portion of the current collector in a thickness direction of the current collector and containing the first negative electrode material, the second negative electrode material, and the third negative electrode material; and
a second region located at a center in the thickness direction of the current collector and containing the first negative electrode material and the third negative electrode material but not containing the second negative electrode material.

3. The negative electrode according to claim 1 for use in a non-aqueous electrolyte secondary battery, wherein the skeleton-forming agent comprises a silicate represented by formula (1):

$$A_2O \cdot nSiO_2$$

wherein A represents n alkali metal and n is 1.6 or more and 3.9 or less.

4. The negative electrode according to claim 1 for use in a non-aqueous electrolyte secondary battery, wherein the second region has a thickness equal to 0.5 to 15% of an overall thickness of the negative electrode.

5. The negative electrode according to claim 1 for use in a non-aqueous electrolyte secondary battery, wherein the porous metal body is a foamed metal body.

6. A non-aqueous electrolyte secondary battery comprising the negative electrode according to claim 1.

\* \* \* \* \*